Patented June 13, 1944

2,351,022

UNITED STATES PATENT OFFICE 2,351,022

FLOORING

William W. Donelson, Boston, and John W. Downey, Newton Center, Mass., assignors to The Federal Flooring Corporation, Boston, Mass., a corporation of Massachusetts No Drawing. Application December 17, 1941, Serial No. 423,330

8 Claims. (Cl. 106—106)

This invention relates to novel composition flooring embodying a combination of highly desirable features not present in flooring heretofore known. Our improved flooring is particularly adapted to use in factories, shops, hospitals, and like places which especially require the features above referred to and hereinafter described. One essential requirement for many of such uses is that the flooring shall be non-productive of sparks from any source or cause and our improved flooring is constructed to fulfill this requirement to a high degree and at the same time to meet the other necessary requirements. These other necessary requirements include a density and hardness sufficient to withstand the substantial crushing forces of heavy loads without injury to the flooring or to its top surface, a smooth top surface that will not dent and can be easily cleaned and kept in sanitary condition, and flooring composition that will repel and withstand the action of oil and grease coming in contact therewith. The composition of our improved flooring is furthermore such that other desirable characteristics, such as the incorporation of desired colors for decorative and other purposes, employed in known flooring are not lost or sacrificed. The production of an improved flooring embodying a novel combination of these desirable features comprises the primary object of our invention.

Our improved flooring preferably incorporates magnesite to a degree giving the flooring many desirable characteristics and furthermore combines therewith a conductive ingredient in amount sufficient to make the flooring a good conductor of electicity but not sufficient to destroy or sacrifice the other desirable characteristics. The conductive ingredient which we prefer to employ is finely divided coke, commonly known as "Coke breeze," and incorporating particles from approximately ⅛" screen size down to and including fine dust. A mineral aggregate filler may also be employed in the mix, the aggregate, as well as the magnesite and conductive ingredient, being non-productive of impact sparks whereby rendering the flooring sparkproof from the dropping of tools and other objects thereonto. Suitable conductors are also incorporated in the flooring and grounded in a manner to dissipate such static electric charges as are brought to the flooring from persons, vehicles and other objects in contact with its top surface.

Sparkproof floors have been in demand for quite some time and we are aware that flooring embodying this characteristic has been heretofore known but we are not aware of any such flooring which also incorporates the other desirable characteristics above referred to. For example, flooring is quite commonly made of asphalt or bituminous compositions and, while such compositions have had conductive ingredients, such as ground coke, combined therewith to make the floor conductive, such flooring is soft and has none of the said other desirable and necessary characteristics. Other sparkproof flooring heretofore known has employed metal grids and like elements which make the flooring extremely expensive and limit its adaptability to certain specific uses. The primary object of our invention is to produce at minimum cost a non-spark flooring for general use which will also incorporate these other required features and thereby serve its desired purpose with complete and maximum efficiency.

In producing our improved flooring, we employ a mix containing about 35% calcined magnesite and a conductive ingredient in the nature of finely divided coke, either with or without a non-sparking mineral aggregate filler. The necessary characteristics of our improved flooring include strength, density, hardness, smooth top surface easily cleaned and kept sanitary, good conductor of electricity and sparkproof from impact, and we have found that a magnesite and finely divided coke mix produces these characteristics in high degree, and we are not aware that any other flooring of a comparable nature has ever before been known. The characteristics produced in the flooring depends quite substantially on the nature or consistency of the mix and for this reason it may or may not be necessary to use a mineral aggregate filler, as will now be described.

Magnesite produces a hard and strong flooring with a smooth top surface easily cleaned and kept sanitary and we have found that finely divided coke, properly graded to size and consistency, will act in like manner with the calcined magnesite to produce a like flooring which is also highly conductive. We have furthermore found however that unless the finely divided coke is so graded the resulting floor will not be satisfactory. If the coke ingredient is too coarse, the flooring will not present the required smooth top surface and, if the coke is too fine, the flooring will not have the requisite strength. Therefore unless equipment and circumstances make it possible to provide coke of the required consistency, it is necessary to add a mineral aggregate filler to give the necessary balance to the mix.

The mineral aggregate filler can be any form of ground limestone or other suitable material which is non-productive of sparks due to impact. We have employed dolomite and talc. If the coke is too coarse, we add sufficient relatively fine mineral aggregate to produce the proper balance and, if the coke is too fine, we add sufficient relatively coarse mineral aggregate to produce the balance. Other ingredients can be added wherever it is desired to produce certain effects, as, for example, asbestos, to facilitate handling and troweling of the mix.

Following are two mixes which we have used and found highly satisfactory:

| | Per cent |
|---|---|
| Calcined magnesite | 35 |
| Finely divided coke, properly graded to size | 60 |
| Color pigment | 5 |
| Calcined magnesite | 35 |
| Finely divided coke | 47 |
| Non-sparking mineral aggregate | 13 |
| Color pigment | 5 |

It will be understood that the ingredient proportions are not absolute and will necessarily vary with varying circumstances. We prefer however that the calcined magnesite shall remain about 35% of the mix although the coke ingredient will necessarily vary with circumstances when mineral aggregate is used. We have found however that the coke should be proportionately in excess of the magnesite. The percentage of color ingredient will also vary with the shade requirements desired.

The ingredients are thoroughly mixed and liquid magnesium chloride of proper strength is added to form the setting plastic composition and renders the ingredients coherent. The composition is then spread over the prepared sub-floor to the desired thickness. The sub-floor will ordinarily be of concrete, although wood, steel, and other suitable material can be employed, and the plastic composition can be placed thereon in either one or two layers. Ordinarily suitably spaced and grounded conductive wires will be placed on or adjacent to the top surface of the concrete in position to receive the plastic composition in bonding engagement therewith, but where two layers are employed the wires can be placed on the top surface of the bottom layer and thus be located between the two layers, as illustrated in our copending application Ser. No. 412,668 filed September 27, 1941.

The thickness of the plastic composition flooring will vary somewhat with conditions and with the area covered but ordinarily a thickness of about ¼" to 1" is employed. The conductive wires will ordinarily be spaced from one to three feet apart, depending upon the conductivity of the flooring composition and the spacing necessary to give a satisfactory ground to all area portions of the flooring. A preferred form of conductive wire is illustrated in our said copending application, this conductor being a single wire looped back and forth across the flooring into a plurality of parallel reaches spaced the required distance apart. The relatively wide spacing of the wires is permitted due to the highly conductive character of our improved flooring. The resistance from any point on the flooring surface to the ground must be sufficiently low to make the floor safe from static charges for the particular purpose used and the spacing of the wires may also therefore depend upon this requirement as well as upon the conductivity of the flooring. We have found that our improved flooring presents a safety factor of resistance very substantially below that produced by any other composition flooring heretofore known and used and that this resistance factor in our flooring is sufficiently low fully to satisfy safety requirements for all purposes.

Magnesite has the property of absorbing moisture and magnesite flooring is therefore an excellent conductor of electricity under moist conditions, but where dry conditions obtain and where the relative humidity of the air is very low, the magnesite gives up its moisture content and becomes dry, whereupon it is an extremely poor conductor. Sparkproof magnesite flooring which we have constructed in the manner hereinabove described is highly conductive in all atmospheres, moist and dry, and has proven sparkproof from either static or impact causes. Furthermore, such flooring, after seven days set, has shown per square inch a crushing strength of approximately 6,000 lbs. and a tensile strength of approximately 600 lbs. and these strengths increase with age. This strength for flooring is relatively high and is therefore adapted quite fully to serve the functions required of flooring where heavy traffic obtains. These features, together with the oil and grease-proof character of the flooring and its smooth top surface which is easily cleaned and kept sanitary, all combine to produce at minimum cost a flooring of the nature described greatly superior to any ever before known.

Having thus described our invention what we claim as new and desire to secure by Letters Patent of the United States is:

1. A composition flooring non-productive of sparks due to impact of other materials therewith and including in its construction calcined magnesite and finely divided coke mixed with liquid magnesium chloride, the coke being proportionately in excess of the magnesite and graded and sized to give substantial strength to the flooring and form a smooth top surface and the flooring being a good conductor of electricity under dry and moist conditions, and electro-conductive means grounding the flooring to dissipate static charges therefrom.

2. The flooring defined in claim 1 comprising substantially 35% calcined magnesite and substantially 60% finely divided coke.

3. An oil and grease-proof composite flooring non-productive of sparks due to impact of other materials therewith and including in its construction calcined magnesite and finely divided coke mixed with liquid magnesium chloride, the coke being proportionately in excess of the magnesite and of approximately ⅛" screen size down to and including fine dust and graded in size to give substantial crushing and tensile strength to the flooring and form a smooth and substantially dent-proof top surface and the flooring being a good conductor of electricity under dry and moist conditions, and electro-conductive means grounding the flooring to dissipate static charges therefrom.

4. An oil and grease-proof, hard and dense composition flooring non-productive of sparks due to impact of other materials therewith and constructed from plastic composition embodying calcined magnesite, finely divided coke and non-sparking mineral aggregate mixed with liquid magnesium chloride, the flooring being a good conductor of electricity under both moist and dry conditions and its top surface being substantially dent-proof, and electro-conductive means grounding the flooring to dissipate static charges therefrom, the coke in the flooring being proportionately in excess of the magnesite.

5. The flooring defined in claim 4 in which the composition ingredients are substantially in the proportions of 47% coke, 35% calcined magnesite and 17% non-sparking mineral aggregate.

6. A hard and substantially dent-proof composition flooring constructed from plastic composition embodying calcined magnesite, finely divided coke and non-sparking mineral aggregate mixed with liquid magnesium chloride and non-productive of sparks due to impact of other materials therewith, the flooring being a good conductor of electricity under both moist and dry conditions and having per square inch a crushing strength greater than 5,000# and a tensile strength greater than 500#, and electro-conductive means grounding the flooring to dissipate static charges therefrom, the coke in the flooring being proportionately in excess of the magnesite.

7. An oil and grease-proof composition flooring non-productive of sparks due to impact of other materials therewith and constructed from plastic composition embodying calcined magnesite, finely divided coke and non-sparking mineral aggregate mixed with liquid magnesium chloride, the coke being in excess of the magnesite and of approximately 1/8" screen size down to and including fine dust and the flooring being a good conductor of electricity under both moist and dry conditions, and electro-conductive means grounding the flooring to dissipate static charges therefrom.

8. A composition flooring non-productive of sparks due to impact of other materials therewith and constructed from calcined magnesite, finely divided coke and non-sparking mineral aggregate mixed with liquid magnesium chloride and sized and combined to give substantial strength to the flooring and form a smooth top surface, the coke being in excess of the magnesite and the flooring being a good conductor of electricity under dry and moist conditions, and electro-conductive means grounding the flooring to dissipate static charges therefrom.

WILLIAM W. DONELSON.
JOHN W. DOWNEY.